(12) United States Patent
Tamanuki

(10) Patent No.: US 8,917,462 B2
(45) Date of Patent: Dec. 23, 2014

(54) OPTICAL TRANSMISSION MODULE AND ITS TEMPERATURE ADJUSTMENT METHOD

(75) Inventor: Takemasa Tamanuki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 686 days.

(21) Appl. No.: 13/205,717

(22) Filed: Aug. 9, 2011

(65) Prior Publication Data

US 2012/0139419 A1 Jun. 7, 2012

(30) Foreign Application Priority Data

Dec. 7, 2010 (JP) .................................. 2010-272227

(51) Int. Cl.
| | |
|---|---|
| *G02B 7/02* | (2006.01) |
| *G02B 6/36* | (2006.01) |
| *H01S 3/04* | (2006.01) |
| *H01J 7/24* | (2006.01) |
| *H01J 13/32* | (2006.01) |
| *H01J 17/28* | (2006.01) |
| *H01J 19/74* | (2006.01) |
| *H01J 61/52* | (2006.01) |
| *G02B 6/42* | (2006.01) |

(52) U.S. Cl.
CPC .................................... *G02B 6/4266* (2013.01)
USPC ................ 359/820; 315/117; 372/34; 385/88

(58) Field of Classification Search
None
See application file for complete search history.

(56) References Cited

U.S. PATENT DOCUMENTS 6,252,726 B1 * 6/2001 Verdiell ........................ 359/820

FOREIGN PATENT DOCUMENTS

| JP | 2005-235867 | 9/2005 |
|---|---|---|
| JP | 2009-289842 | 12/2009 |

OTHER PUBLICATIONS

Apr. 8, 2014 Office Action from JP 2010-272227, 2 pages.

* cited by examiner

*Primary Examiner* — Douglas W Owens
*Assistant Examiner* — Dedei K Hammond
(74) *Attorney, Agent, or Firm* — Nixon & Vanderhye PC

(57) ABSTRACT

An optical transmission module includes a light source element for emitting a predetermined light signal transmitted through an optical fiber, the light source element having lower characteristics in a low-temperature state than those in a high-temperature state, a driver circuit for driving the light source element, and a heat transfer member connected to each of the light source element and the driver circuit to transfer heat between the light source element and the driver circuit. The optical transmission module with such configuration can stably operate in a wide temperature range while achieving power saving and cost reduction.

6 Claims, 4 Drawing Sheets

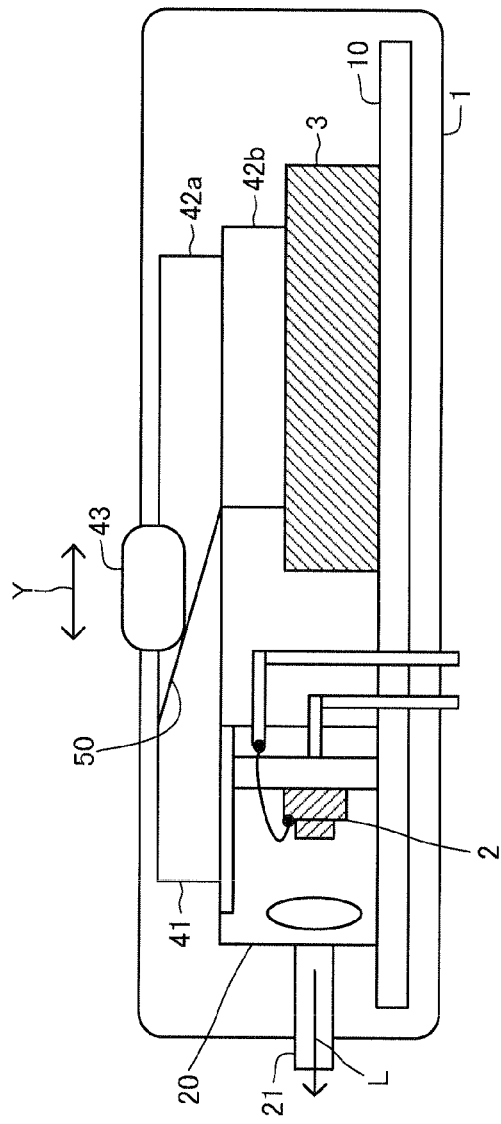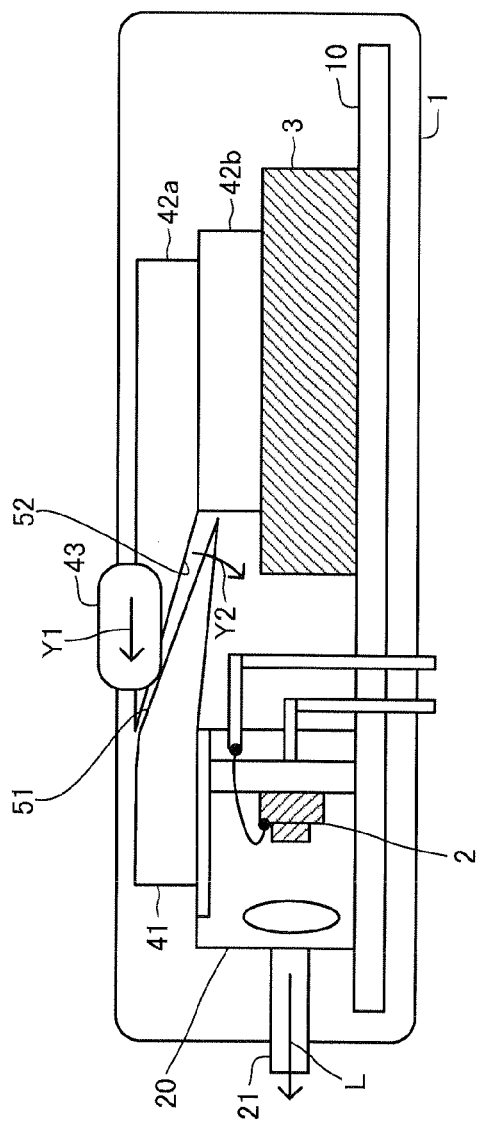

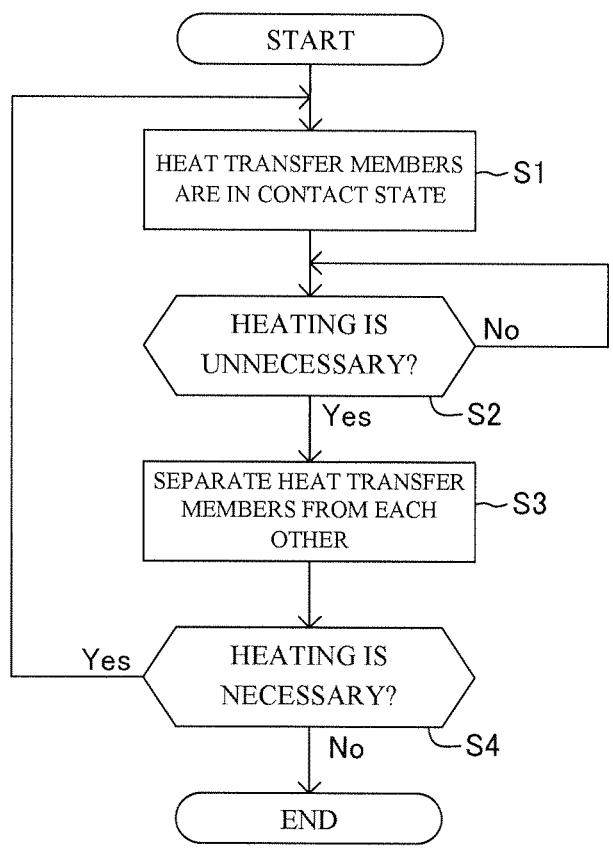

OPTICAL TRANSMISSION MODULE AND ITS TEMPERATURE ADJUSTMENT METHOD

This application claims priority to Japanese Application No. 2010-272227 filed 7 Dec. 2010, the entire contents of which is hereby incorporated by reference.

TECHNICAL FIELD

The present invention relates to an optical transmission module, in particular, to an optical transmission module having a temperature adjustment function. The present invention also relates to a temperature adjustment method of the optical transmission module.

BACKGROUND ART

In an optical transmission module for optical interconnection, a light source element is required to operate in a wide temperature range from −40° C. to 80° C., for example. In order to meet such requirement, Patent document 1 discloses an optical transmission module provided with a temperature adjustment member such as a Peltier device or a heater so as to maintain a laser diode at a constant temperature.

However, since the above-mentioned optical transmission module is provided with the Peltier device or the heater, it is need to provide excessive electric power or part for driving the Peltier device or the heater, causing a problem that electric power saving, miniaturization of the module itself and cost reduction are difficult. Moreover, since the Peltier device and the heater are expensive, the optical transmission module equipped with the Peltier device or the heater is hard to be adopted as a consumer product.

In semiconductor lasers including a VCSEL (Vertical Cavity Surface Emitting LASER), a DBR (Distributed Bragg Reflector) laser and a DFB (Distributed Feedback) laser, a wavelength ($\lambda c$) of an emitted laser beam is determined by a resonator and a reflecting mirror that is integrated (formed) in a semiconductor laser device. Thus, by matching a peak wavelength ($\lambda p$) of a gain spectrum of an active layer with the wavelength $\lambda c$, the semiconductor laser exhibits optimum characteristics (ex. high optical output and high power-light conversion efficiency). Conversely, as a difference between $\lambda p$ and $\lambda c$ becomes larger, the characteristics of the semiconductor laser are deteriorated.

[Patent document 1] Unexamined Patent Publication No. 2005-235867

SUMMARY OF THE INVENTION

However, it is known that $\lambda c$ and $\lambda p$ have different temperature dependencies. For example, in a GaAs-based VCSEL having a luminous wavelength of 850 nm, $\triangle \lambda c / \triangle T$ is about 0.05 nm/K and $\triangle \lambda p / \triangle T$ is about 1 nm/K. T is environmental temperature. Accordingly, when the resonator or the reflecting mirror is designed so that the characteristics of the semiconductor laser become optimum, that is, $\lambda p$ matches $\lambda c$ at high temperatures, the difference between $\lambda p$ and $\lambda c$ becomes large at low temperatures, thereby deteriorating the characteristics of the LD. Conversely, when the resonator or the reflecting mirror is designed so that the characteristics of the semiconductor laser become optimum at low temperatures, the characteristics of the LD deteriorate at high temperatures. In other words, disadvantageously, it is difficult to provide an optical transmission module, unlike the optical transmission module described in Patent document 1, which stably operates in a wide temperature range at low costs without consuming excessive electric power.

Therefore, an object of the present invention is to provide the above-mentioned optical transmission module that stably operates in a wide temperature range while achieving energy saving and cost reduction.

To achieve the above-mentioned object, an optical transmission module from one aspect of the present invention includes a light source element for emitting a predetermined light signal transmitted through an optical fiber, the light source element having lower characteristics in a low-temperature state than those in a high-temperature state;

a driver circuit for driving the light source element; and a heat transfer member connected to each of the light source element and the driver circuit to transfer heat between the light source element and the driver circuit.

The heat transfer member is not necessarily in direct contact with the light source element or the driver circuit and may be connected to the light source element or the driver circuit through another member. For example, the heat transfer member may be connected to the light source element through an optical package part that mounts the light source element therein.

According to the present invention, since the driver circuit is connected to the light source element through the heat transfer member, heat generated at the driver circuit can be transferred to the light source element to increase the temperature of the light source element itself, thereby preventing the low-temperature state of the light source element. Therefore, since any additive electric power or expensive part is not required, it is possible to provide an optical transmission module that can prevent deterioration of the characteristics of the light source element and stably operate in a wide temperature range while achieving power saving and cost reduction.

In the optical transmission module, the heat transfer member includes a first member connected to the light source element and a second member connected to the driver circuit, and the first member and the second member can be put into contact with each other and be separated from each other.

In the optical transmission module, the heat transfer member includes a switch unit for switching between contact and separation of the first member and the second member, the switch unit allows the first member and the second member to come into contact with each other when the temperature of the light source element itself is lower than a preset temperature, and allows the first member and the second member to be separated from each other when the temperature of the light source element itself is higher than the preset temperature.

In the optical transmission module, the switch unit operates so as to switch between contact and separation of the first member and the second member according to the temperature of the driver circuit itself or the light source element itself.

Herein, the state where the first member and the second member are in contact with each other means that the state where the first member and the second member are in contact with each other so that heat can be transferred between the two members. This contact is not limited to direct contact and may be contact through another material or object that is interposed between these members.

As described above, the temperature of the light source element can be easily adjusted by switching between contact and separation of the first member and the second member. Further, the temperature of the light source element can be automatically set to an appropriate temperature by using the switch unit for switching between contact and separation of the first member and the second member.

According to a temperature adjustment method of an optical transmission module from another aspect of the present invention, in the optical transmission module including a light source element for emitting a predetermined light signal transmitted through an optical fiber, the light source element having lower characteristics in a low-temperature state than those in a high-temperature state, a driver circuit for driving the light source element, and a heat transfer member connected to each of the light source element and the driver circuit to transfer heat between the light source element and the driver circuit, in the case where the heat transfer member has a first member connected to the light source element and a second member connected to the driver circuit, the first member and the second member are switched to come into contact with each other or to be separated from each other.

According to the temperature adjustment method of the optical transmission module, when the temperature of the light source element itself is lower than a preset temperature, the first member and the second member are switched to come into contact with each other, and when the temperature of the light source element itself is higher than the preset temperature, the first member and the second member are switched to be separated from each other.

According to the above-mentioned temperature adjustment method of the optical transmission module, as in the optical transmission module with the above-mentioned configuration, deterioration of the characteristics of the light source element can be prevented and the optical transmission module can stably operate in a wide temperature range while achieving power saving and cost reduction.

With the above-mentioned configuration and functions according to the present invention, it is possible to provide an optical transmission module that can prevent deterioration of the characteristics of the light source element and stably operate in a wide temperature range while achieving power saving and cost reduction.

BRIEF DESCRIPTION OF DRAWINGS

FIG. 2 is a view showing configuration of the optical transmission module according to the present invention;

FIG. 3 is a view showing the configuration of the optical transmission module according to the present invention;

FIG. 5 is a flowchart showing operations at switching between contact and separation of a heat transfer member in the optical transmission module according to the present invention.

DETAILED DESCRIPTION OF PREFERRED EMBODIMENTS

First Embodiment

Figure 1:
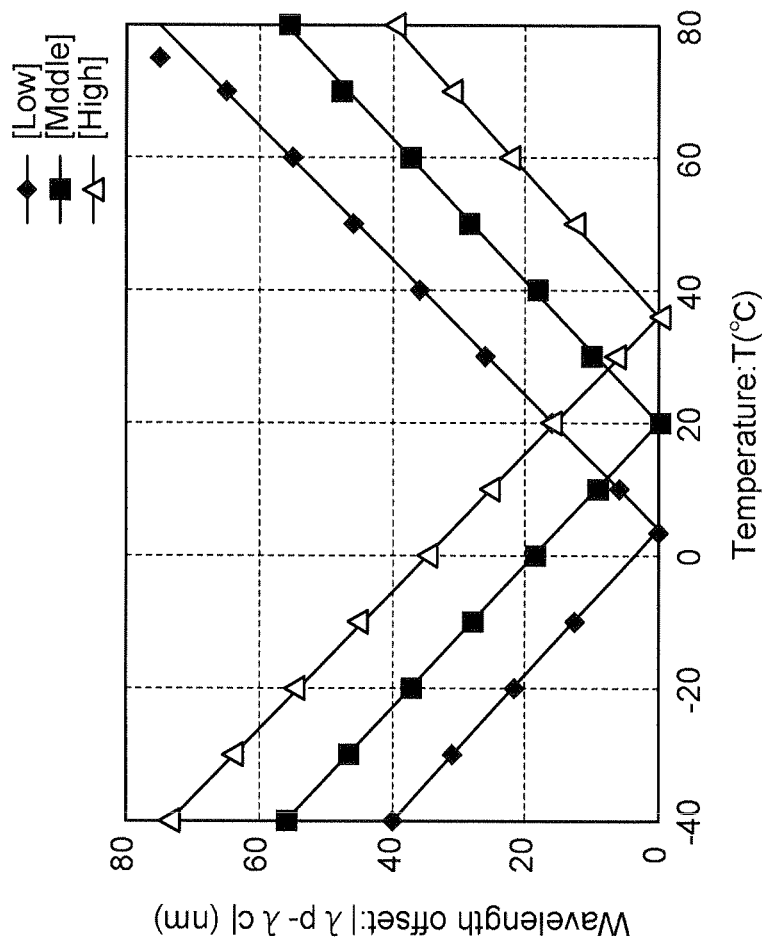
FIG. 1 is a view for describing characteristics of a light source element mounted in an optical transmission module according to the present invention.
Figure 4:
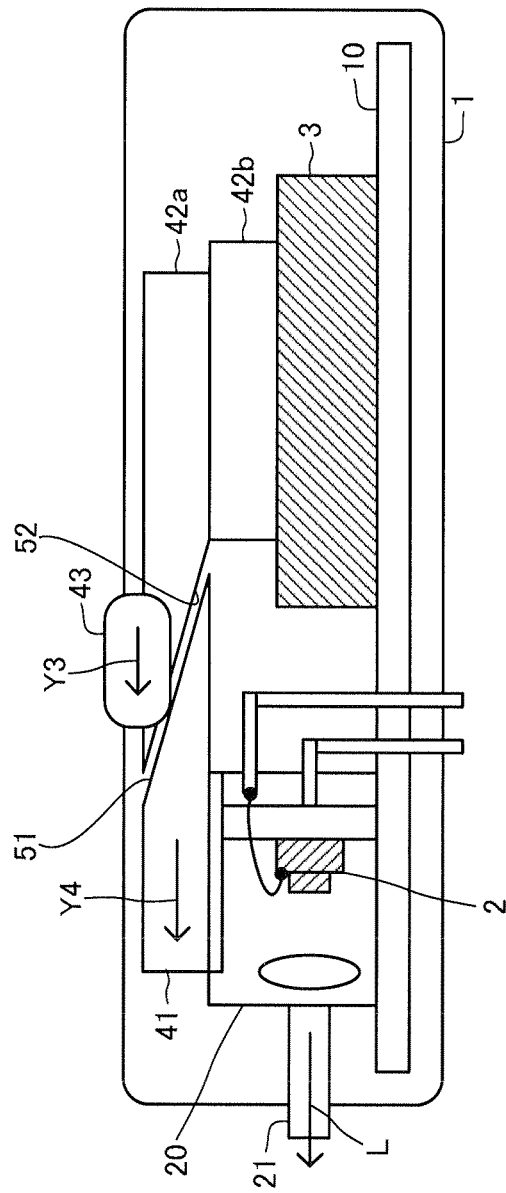
FIG. 4 is a view showing the configuration of the optical transmission module according to the present invention.

First embodiment of the present invention will be described with reference to FIG. 1 to FIG. 5. FIG. 1 is a view for describing characteristics of a light source element mounted in an optical transmission module. FIG. 2 to FIG. 4 are views showing configuration of the optical transmission module. FIG. 5 is a flowchart showing operations of the optical transmission module.

The optical transmission module 1 of the present invention is an optical transmission module for optical interconnection and includes a semiconductor laser 2 as a light source element. The semiconductor laser in this embodiment is, in particular, a VCSEL. However, the semiconductor laser 2 is not limited to the VCSEL and may be another semiconductor laser such as a DBR laser or a DFB laser. Further, the light source element is not limited to the semiconductor laser.

In the VCSEL as the semiconductor laser 2 in this embodiment, a wavelength ($\lambda c$) of an emitted laser beam is determined by a resonator or a reflecting mirror that is integrated (formed) in a semiconductor laser device. Thus, by matching a peak wavelength ($\lambda p$) of a gain spectrum of an active layer with $\lambda c$, the semiconductor laser exhibits optimum characteristics such as high optical output and high power-light conversion efficiency. Conversely, as a difference between $\lambda p$ and $\lambda c$ becomes larger, the characteristics of the semiconductor laser are deteriorated.

However, $\lambda c$ and $\lambda p$ have different temperature dependencies. For example, in a GaAs-based VCSEL having a luminous wavelength of 850 nm, the temperature dependencies of $\lambda c$ and $\lambda p$ are $\triangle \lambda c / \triangle T$ of about 0.05 nm/K and $\triangle \lambda p / \triangle T$ of about 1 nm/K, respectively, T is environmental temperature. Accordingly, when the resonator or the reflecting mirror is designed so that the characteristics of the semiconductor laser become optimum, that is, $\lambda p$ matches $\lambda c$ at high temperatures, the difference between $\lambda p$ and $\lambda c$ becomes large at low temperatures, thereby deteriorating the characteristics of the LD. Conversely, when the resonator or the reflecting mirror is designed so that the characteristics of the semiconductor laser become optimum at low temperatures, the characteristics of the semiconductor laser deteriorate at high temperatures.

FIG. 1 shows calculation results on relationship between the difference between $\lambda p$ and $\lambda c$ ($|\lambda p - \lambda c|$) and environmental temperature (T). This figure shows the case where the temperature dependencies of $\lambda p$ and $\lambda c$ are $\triangle \lambda c / \triangle T$ of 0.05 nm/K and $\triangle \lambda p / \triangle T$ of 1 nm/K as described above, and $\lambda p$ matches $\lambda c$ ($|\lambda p - \lambda c| = 0$ nm) at 2° C. ([Low]), 20° C. ([Middle]) and 38° C. ([High]). As apparent from this figure, as the value $|\lambda p - \lambda c|$ becomes larger, characteristics of the semiconductor laser deteriorates. It is assumed that when the value $|\lambda p - \lambda c|$ is smaller than <40 nm, the characteristics of the optical transmission module can maintain communication capability.

Then, as shown in FIG. 1, allowable temperature ranges of the semiconductor laser designed for [Low], [Middle] and [High] are −40° C. to 44° C., −22° C. to 62° C. and −2° C. to 80° C., respectively. This means that the semiconductor laser designed for [Low] is a "semiconductor laser optimized at relatively low temperatures", the semiconductor laser designed for [High] is a "semiconductor laser optimized at relatively high temperatures" and the semiconductor laser designed for [Middle] is a "semiconductor laser optimized at intermediate temperatures".

It is given that the semiconductor laser 2 used in this embodiment is the above-mentioned semiconductor laser designed for [High] or [Middle] having the characteristics that become optimum in a high-temperature state and deteriorate at in a low-temperature state. Further, it is given that the high-temperature state in the semiconductor laser designed for [High] represents a preset temperature state having a predetermined temperature range centering on 38° C. as a temperature at which λp matches λc (|λp−λc|=0 nm) (for example, −2° C. to 80° C.), and a low-temperature state represents a preset temperature state having a predetermined temperature range that is lower than the lowest temperature (−2° C.) in the above-described temperature range centering on 38° C. (for example, −2° C. to 80° C.).

As described above, since the semiconductor laser 2 of the present invention has the property that its characteristics deteriorate in the preset low-temperature state, the semiconductor laser 2 needs to be kept in the preset high-temperature state where the characteristics become optimum. For this reason, the optical transmission module 1 of the present invention further includes following structures.

Specifically, the optical transmission module 1, as shown in FIG. 2, includes a printed board 10 and on the printed board 10, an optical package part 20 that mounts the semiconductor laser 2 therein. The optical package part 20 has an optical fiber connector 21 connected to a lens for condensing light emitted from the mounted semiconductor laser 2 and to an optical fiber for transmitting a light signal, and allows the semiconductor laser 2 to emit the light signal as represented by an arrow L in FIG. 2.

The optical transmission module 1 further includes a driver IC 3 as a driver circuit for driving the semiconductor laser 2 on the printed board 10. The semiconductor laser 2 and the driver IC 3 are diagonally shaded in FIG. 2 and other figures merely to facilitate understanding positional relationship among the parts for the sake of convenience.

The optical transmission module 1 of the present invention further includes heat transfer members 41, 42a, 42b for interconnecting the semiconductor laser 2 and the driver IC 3 so that heat can be transferred between the semiconductor laser 2 and the driver IC 3. Specifically, the heat transfer members 41, 42a, 42b are composed of a semiconductor laser-side heat transfer member 41 (first member) connected to the semiconductor laser 2, and driver IC-side heat transfer members 42a, 42b (second members) connected to the driver IC 3. The semiconductor laser-side heat transfer member 41 is connected to the semiconductor laser 2 through the optical package part 20 to enable heat transfer between the semiconductor laser-side heat transfer member 41 and the semiconductor laser 2. The driver IC-side heat transfer member 42a is a second driver IC-side heat transfer member 42a connected to the driver IC 3 through the member 42b and the driver IC-side heat transfer member 42b is a first driver IC-side heat transfer member 42b in direct contact with the driver IC 3.

The semiconductor laser-side heat transfer member 41 and the second driver IC-side heat transfer member 42a can be switched so as to be in contact with each other or be separated from each other. Specifically, the semiconductor laser-side heat transfer member 41 and the second driver IC-side heat transfer member 42a have respective diagonally-cut contact surfaces 50 (reference numerals 51, 52 in FIG. 3 or FIG. 4). The second driver IC-side heat transfer member 42a has a switch 43 (switch unit) that is movable to switch between contact and separation of the semiconductor laser-side heat transfer member 41 and the second driver IC-side heat transfer member 42a.

As represented by an arrow Y in FIG. 2, the switch 43 can move toward the semiconductor laser-side heat transfer member 41 and the second driver IC-side heat transfer member 42a. When, as represented by an arrow Y1 in FIG. 3, the switch 43 is moved toward the semiconductor laser-side heat transfer member 41, the switch 43 presses the contact surface 51 of the semiconductor laser-side heat transfer member 41 and thus, a section forming the contact surface 51 is bent downward as represented by an arrow Y2. As a result, the contact surface 51 of the semiconductor laser-side heat transfer member 41 is separated from the contact surface 52 of the second driver IC-side heat transfer member 42a. When the switch 43 returns to the original position as shown in FIG. 2, the contact surface 51 of the semiconductor laser-side heat transfer member 41 comes into contact with the contact surface 52 of the second driver IC-side heat transfer member 42a.

For example, the semiconductor laser-side heat transfer member 41 may be mounted so as to be slidable with respect to the optical package part 20. In this case, when the switch 43 moves as represented by an arrow Y3 in FIG. 4, the semiconductor laser-side heat transfer member 41 is pressed and moves in a direction represented by an arrow Y4, resulting in that the semiconductor laser-side heat transfer member 41 is separated from the second driver IC-side heat transfer member 42a.

However, the structure for putting the semiconductor laser-side heat transfer member 41 into contact with the second driver IC-side heat transfer member 42a or for separating the semiconductor laser-side heat transfer member 41 from the second driver IC-side heat transfer member 42a is not limited to the above-mentioned structures. For example, the second driver IC-side heat transfer member 42a may be moved by use of the switch 43 or other means, thereby coming into contact with or separated from the semiconductor laser-side heat transfer member 41.

As described above, in the state where the semiconductor laser-side heat transfer member 41 is in contact with the second driver IC-side heat transfer member 42a (Step S1 in FIG. 5), heat generated by action of the driver IC 3 is transferred to the second driver IC-side heat transfer member 42a through the first driver IC-side heat transfer member 42b, and further to the semiconductor laser-side heat transfer member 41. Then, the heat transferred from the driver IC 3 to the semiconductor laser-side heat transfer member 41 is transferred to the semiconductor laser 2 through the optical package part 20, thereby heating the semiconductor laser 2.

After that, when the semiconductor laser 2 is heated to a predetermined temperature and need not be further heated (Yes in Step S2 in FIG. 5), by moving the switch 43 to separate the semiconductor laser-side heat transfer member 41 from the second driver IC-side heat transfer member 42a as shown in FIG. 3 (Step S3 in FIG. 5), the heat generated at the driver IC 3 is not transferred to the semiconductor laser 2.

After that, when the semiconductor laser 2 is lowered in temperature and need be heated (Yes in Step S4 in FIG. 5), by moving the switch 43 to return to the original position as shown in FIG. 2, the semiconductor laser-side heat transfer member 41 comes into contact with the second driver IC-side heat transfer member 42a (Step S1 in FIG. 5). As a result, the semiconductor laser 2 is heated by the heat generated at the driver IC 3 again.

As described above, in order to prevent the low-temperature state where the characteristics of the semiconductor laser 2 deteriorate, the switch 43 performs a switching operation of putting the semiconductor laser-side heat transfer member 41 into contact with second driver IC-side heat transfer member 42a or separating the semiconductor laser-side heat transfer member 41 from the second driver IC-side heat transfer member 42a according to the temperature of the semiconductor laser 2. Specifically, when the temperature of the semiconductor laser 2 itself is lower than a preset temperature, that is, the environmental temperature is low and the semiconductor laser 2 need be heated, the semiconductor laser-side heat transfer member 41 is put into contact with the second driver IC-side heat transfer member 42a. On the contrary, when the temperature of the semiconductor laser 2 itself is higher than the preset temperature, that is, the environmental temperature is high and the semiconductor laser need not be heated, the semiconductor laser-side heat transfer member 41 is separated from the second driver IC-side heat transfer member 42a.

This switching operation of the switch 43 can be performed in any way, for example, may be manually made by the operator, or may be automatically made according to the temperature of the semiconductor laser 2. When the switching operation is automatically controlled, for example, a sensor for measuring the temperature of the semiconductor laser 2 and a moving mechanism for moving the switch 43 are provided. According to the temperature of the semiconductor laser 2, which is measured by the sensor, the moving mechanism moves the switch 43 so as to put the semiconductor laser-side heat transfer member 41 into contact with the second driver IC-side heat transfer member 42a or separate the semiconductor laser-side heat transfer member 41 from the second driver IC-side heat transfer member 42a. Alternatively, as described above, the switch 43 itself may be deformed so as to put the semiconductor laser-side heat transfer member 41 into contact with the second driver IC-side heat transfer member 42a or separate the semiconductor laser-side heat transfer member 41 from the second driver IC-side heat transfer member 42a. In the latter case, the above-mentioned operation can be realized by using the switch 43 made of bimetal.

As has been described, in the optical transmission module of the present invention, since the semiconductor laser 2 as the light source element is connected to the driver IC 3 through the heat transfer members 41, 42a, 42b, the heat generated at the driver IC 3 can be transferred to the semiconductor laser 2. In this manner, the temperature of the semiconductor laser 2 itself can be increased, thereby preventing the low-temperature state where the characteristics of the semiconductor laser 2 deteriorate. Accordingly, the temperature of the semiconductor laser 2 can be adjusted without adding electric power or expensive parts, it is possible to an optical transmission module that can prevent deterioration of the characteristics of the semiconductor laser 2 and stably operate in a wide temperature range while achieving power saving and cost reduction.

Further, the temperature of the semiconductor laser 2 can be easily adjusted by providing the switch 43 for switching between contact and separation of the heat transfer members 41, 42a, 42b. Moreover, the quality of the optical transmission module can be further improved by automatically performing the switching operation of the switch 43 according to the temperature of the semiconductor laser 2.

The invention claimed is:

1. An optical transmission module comprising:
   a light source element for emitting a predetermined light signal transmitted through an optical fiber, the light source element having characteristics that are deteriorated in a low-temperature state;
   a driver circuit for driving said light source element; and
   a heat transfer member connected to each of said light source element and said driver circuit to transfer heat between said light source element and said driver circuit; wherein:
   said heat transfer member includes a first member connected to said light source element and a second member connected to said driver circuit; and
   said first member and said second member can be put into contact with each other and separated from each other.

2. The optical transmission module according to claim 1, wherein:
   said heat transfer member includes a switch unit for switching between contact and separation of said first member and said second member, and
   said switch unit allows said first member and said second member to come into contact with each other when the temperature of said light source element itself is lower than a preset temperature, and allows said first member and said second member to be separated from each other when the temperature of said light source element itself is higher than the preset temperature.

3. The optical transmission module according to claim 2, wherein said switch unit operates so as to switch between contact and separation of said first member and said second member according to the temperature of said driver circuit itself or said light source element itself.

4. The optical transmission module according to claim 1, wherein said heat transfer member is connected to said light source element through an optical package part that mounts said light source element therein.

5. A temperature adjustment method of an optical transmission module including a light source element for emitting a predetermined light signal transmitted through an optical fiber, the light source element having characteristics that are deteriorated in a low-temperature state, a driver circuit for driving said light source element, and a heat transfer member connected to each of said light source element and said driver circuit to transfer heat between said light source element and said driver circuit, wherein:
   in the case where said heat transfer member has a first member connected to said light source element and a second member connected to said driver circuit, said first member and said second member are switched to come into contact with each other or to be separated from each other.

6. The temperature adjustment method of the optical transmission module according to claim 5, wherein when the temperature of said light source element itself is lower than a preset temperature, said first member and said second member are switched to come into contact with each other, and when the temperature of said light source element itself is higher than the preset temperature, said first member and said second member are switched to be separated from each other.

* * * * *